United States Patent
Wayman (10) Patent No.: US 9,114,652 B1
(45) Date of Patent: Aug. 25, 2015

(54) SYSTEM FOR DETECTING INOPERATIVE INKJETS IN PRINTHEADS EJECTING CLEAR INK USING HEATED THERMAL SUBSTRATES

(71) Applicant: Xerox Corporation, Norwalk, CT (US)

(72) Inventor: William H. Wayman, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/231,326

(22) Filed: Mar. 31, 2014

(51) Int. Cl.
| | |
|---|---|
| *B41J 29/393* | (2006.01) |
| *B41J 2/32* | (2006.01) |
| *B33Y 30/00* | (2015.01) |
| *B41J 11/00* | (2006.01) |

(52) U.S. Cl.
CPC ........ *B41J 29/393* (2013.01); *B41J 2/32* (2013.01); *B33Y 30/00* (2014.12); *B41J 11/0095* (2013.01)

(58) Field of Classification Search
CPC .................. B41J 2/32; B41J 11/0095
See application file for complete search history.

(56) References Cited

U.S. PATENT DOCUMENTS

| | | | |
|---|---|---|---|
| 8,419,144 B2* | 4/2013 | Castillo et al. | ..... 347/8 |
| 2004/0012112 A1 | 1/2004 | Davidson et al. | |
| 2006/0111807 A1 | 5/2006 | Gothait et al. | |
| 2006/0141145 A1 | 6/2006 | Davidson et al. | |
| 2009/0011066 A1 | 1/2009 | Davidson et al. | |
| 2010/0060708 A1* | 3/2010 | Iwazaki | ..... 347/218 |
| 2010/0151136 A1 | 6/2010 | Davidson et al. | |

FOREIGN PATENT DOCUMENTS

WO      03/026876 A2    4/2003

* cited by examiner

*Primary Examiner* — Lisa M Solomon
(74) *Attorney, Agent, or Firm* — Maginot Moore & Beck, LLP (57) ABSTRACT

An apparatus detects inoperative inkjets during printing operations. The apparatus includes a supply of thermal substrate that is exposed to heat to darken the substrate. The thermal substrate is printed with materials ejected from a printhead to form a test pattern. The contrast between the ejected materials and the exposed thermal substrate are imaged by an optical sensor to generate image data that are analyzed to identify inoperative inkjets.

16 Claims, 5 Drawing Sheets

SYSTEM FOR DETECTING INOPERATIVE INKJETS IN PRINTHEADS EJECTING CLEAR INK USING HEATED THERMAL SUBSTRATES

TECHNICAL FIELD

The device disclosed in this document relates to printers that detect inoperative inkjets and, more particularly, to accurate detection of inoperative inkjets in printers that use clear inks.

BACKGROUND

Printing of documents on substrates, such as paper, are well-known. Newer forms of printing now include digital three-dimensional manufacturing, also known as digital additive manufacturing. This type of printing is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the drops of material that form the objects. During printing of an object, one or more inkjets can deteriorate by ejecting the material at an angle, rather than normal, to the printhead, ejecting drops that are smaller than an inkjet should eject, or by failing to eject any drop at all. An inkjet suffering from any of these operational deficiencies is known as an inoperative inkjet. Similar maladies in printheads are known in document printing with printheads. If the operational status of one or more inkjets deteriorates during three-dimensional object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. Even in document printing at high speeds on a moving web, unacceptable images may be produced over a long length of the web and this portion of the web may have to be scrapped.

Although systems have been developed in document printing systems to detect inoperative inkjets, the detection of inoperative inkjets in object printing systems is more problematic. Particularly problematic in both object printing and document printing systems are the use of the clear materials and inks. These materials and inks are difficult to detect by imaging systems because the contrast between the clear inks/materials on the substrates on which they are ejected is low. Consequently, the noise in the image data of the patterns on the substrate makes analysis of the test pattern difficult. An apparatus that enables detection of inoperative inkjets while printing with clear ink or clear materials would enable restorative procedures to be applied during object printing so printing that can produce a properly formed object or document could continue. In this manner, product yield for the printer is improved and its printing is more efficient.

SUMMARY

An apparatus that enables inoperative inkjet detection in three-dimensional printers includes a supply of thermal substrate, an optical sensor configured to generate electrical signals data corresponding to an area of material on the substrate, an actuator operatively connected to the optical sensor to move the optical sensor to a position opposite the thermal substrate onto which material has been ejected, a heater configured to expose a length of thermal substrate to heat, and a controller operatively connected to the actuator, the optical sensor, the heater, the controller being configured to operate the heater to darken a length of thermal substrate exposed to heat after a printhead has been operated to eject a predetermined number of material drops from each inkjet in the printhead onto the thermal substrate to form a test dot for each inkjet on the thermal substrate, to operate the actuator to the optical sensor to a position opposite the thermal substrate, and to identify inoperative inkjets in the printhead with reference to the data received from the optical sensor that corresponds to optical densities of the thermal substrate at a plurality of locations on the thermal substrate.

A printer that incorporates the apparatus for detecting inoperative inkjets includes a printhead configured with a plurality of inkjets to eject material, a supply of thermal substrate configured to move thermal substrate to a position opposite the printhead to receive material ejected from the printhead, an optical sensor configured to generate electrical signals corresponding to an optical density of a location on the thermal substrate, an actuator operatively connected to the optical sensor to move the optical sensor to a position opposite the thermal substrate onto which material has been ejected, a heater configured to expose a length of thermal substrate to heat, and a controller operatively connected to both actuators, the optical sensor, the heater, and the printhead, the controller being configured to operate the printhead to eject a predetermined number of material drops from each inkjet onto the thermal substrate to enable the predetermined number of material drops to form a test dot for each inkjet on the thermal substrate, to operate the heater to darken a length of thermal substrate exposed to heat, to operate the actuator to move the optical sensor to a position opposite the thermal substrate to generate image data of the substrate and the test dots on the substrate, and to identify inoperative inkjets in the printhead with reference to the data received from the optical sensor that corresponds to optical densities of the thermal substrate at a plurality of locations on the thermal substrate.

BRIEF DESCRIPTION OF THE DRAWINGS

The foregoing aspects and other features of an apparatus or printer that detects inoperative inkjets during three-dimensional printing are explained in the following description, taken in connection with the accompanying drawings.

DETAILED DESCRIPTION

For a general understanding of the environment for the device disclosed herein as well as the details for the device, reference is made to the drawings. In the drawings, like reference numerals designate like elements.

Figure 1:
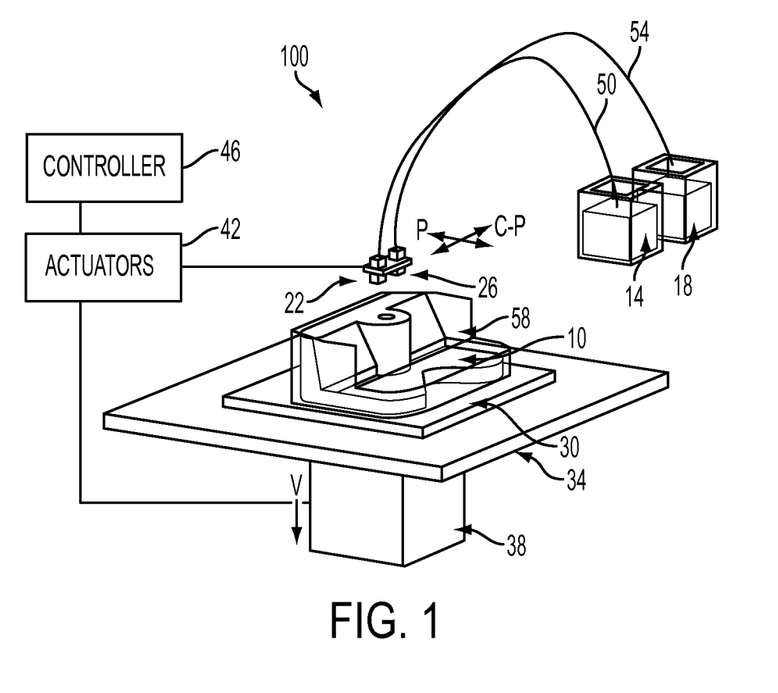
FIG. 1 is a perspective view of a three-dimensional object printer.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both inkjet printheads are operated by the controller 46 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. The support material also allows the build material to bridge gaps in the underlying object. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
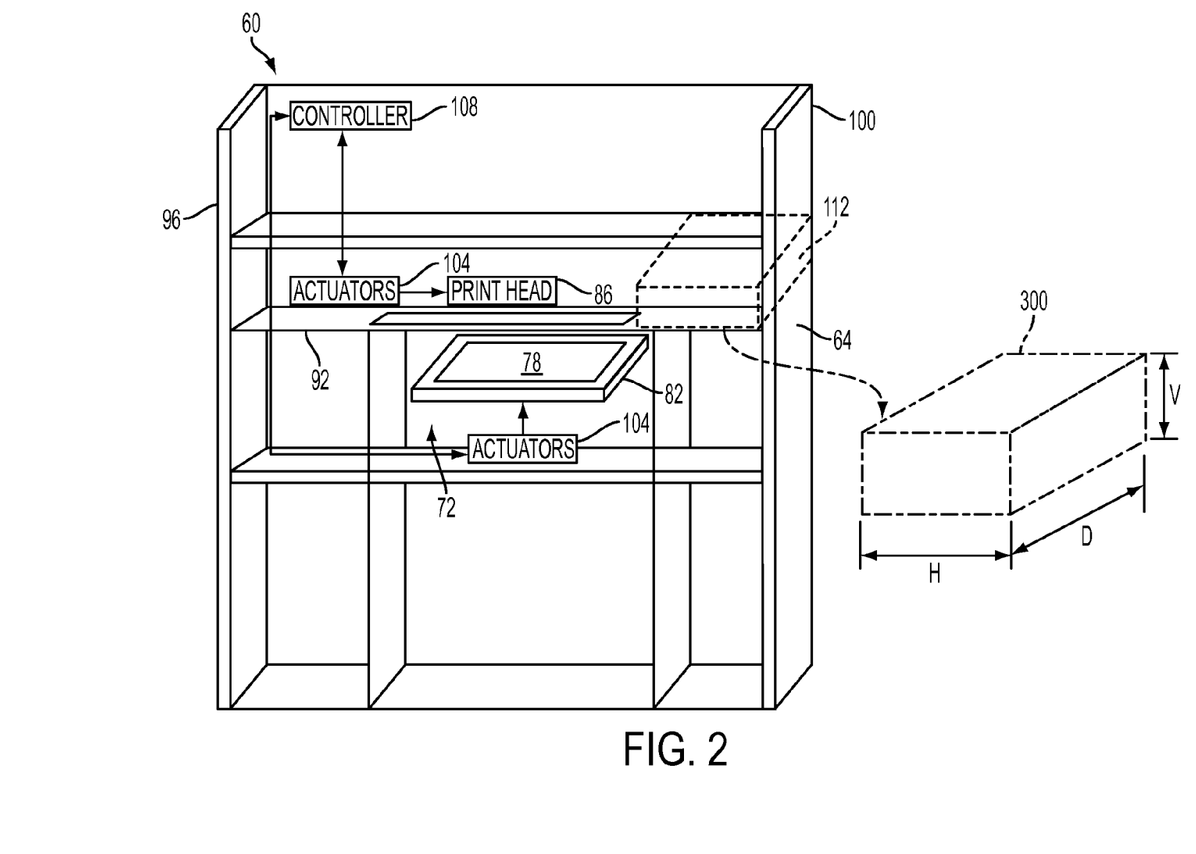
FIG. 2 is front view of a three-dimensional object printer having a housing that depicts a space within the housing for a module that enables inoperative inkjets in the printhead to be detected during a printing operation.

A three-dimensional object printer having a housing is shown in FIG. 2. Printer 60 has a housing 64. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that prints a test pattern on thermal substrate to detect inoperative inkjets in the printer 60. As noted above, if an inkjet fails during printing of an object by either completely or partially failing to eject material or by errantly ejecting material in a skewed direction, the object being produced is malformed. Currently, this malformation cannot be detected until production of the object is finished. By using area 112 for optically sensing inoperative inkjets, printer 60 can be configured to detect inoperative inkjets during object production as described more fully below. Some components within the module 300 can move in the horizontal direction H, depth direction D, and vertical direction V as shown in the figure.

Figure 3:
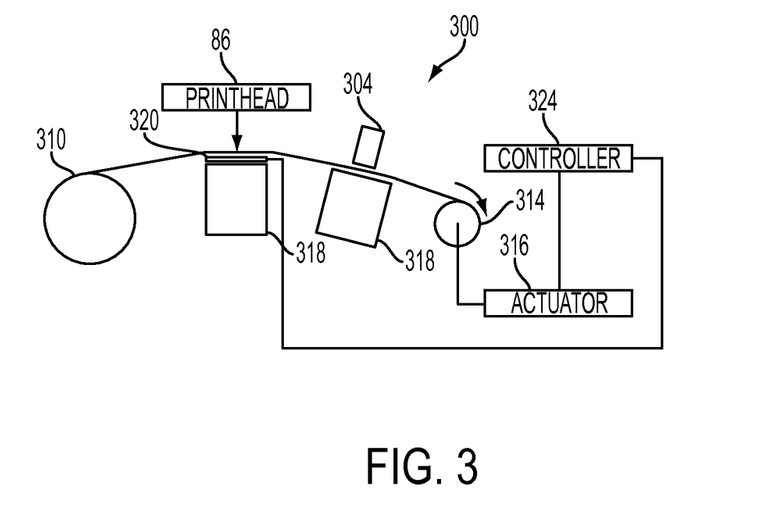
FIG. 3 is a perspective view of a module for detecting inoperative inkjets that fits in the space shown in FIG. 2.

One embodiment of a module that detects inoperative inkjets during object printing is shown in the block diagram of FIG. 3. In that embodiment, the module 300 is formed with a roller supporting a supply of thermal substrate for the printing of test patterns that are moved to a take-up roller. The module 300 is also configured to fit within area 112 of printer 60. The module 300 includes an optical sensor 304, a supply roll 310 of thermal substrate on a roller, a take-up roller 314, one or more actuators 316, a pair of support members 318, a heater 320, and a controller 324. The optical sensor 304 is positioned to image the test pattern on the substrate pulled from supply 310 after printhead 86 has printed the test pattern on the substrate. The controller 324 is operatively connected to the heater 320 and the actuator 316. Although the heater is depicted as being a component of support 318, it could be positioned between the roll 310 and the support 318 beneath the printhead 86 or it could be positioned to heat the substrate after it is printed. The controller 324 selectively activates the heater 320 to expose the portion of the substrate printed with the test pattern with sufficient heat energy to cause the heat sensitive coatings on the thermal substrate to chemically react and darken. This reaction is sometimes called development of the thermal substrate. As used in this document, "heater" refers to any material configured to generate heat selectively in response to application of a stimulus, such as an electrical current or chemical catalyst. The controller 324 also selectively drives the take-up roller 314 to pull substrate from the supply roll 310 to the position where it is printed, then to the position where it is imaged, and finally to the take up roller 314.

The thermal substrate on the roll 310 can be made of a substance that supports the build material and the support material ejected from the printhead 86, such as paper, which is coated with a heat sensitive dye that changes color in response to exposure to heat from the heater 320. The substrate increases in optical density with reference to a known function of optical density per unit of heat energy input to the material of the thermal substrate. For example, the supply roll 310 can be a roll of P35032 paper available from Kanzaki Specialty Papers, Inc. of Springfield, Mass.

Figure 4:
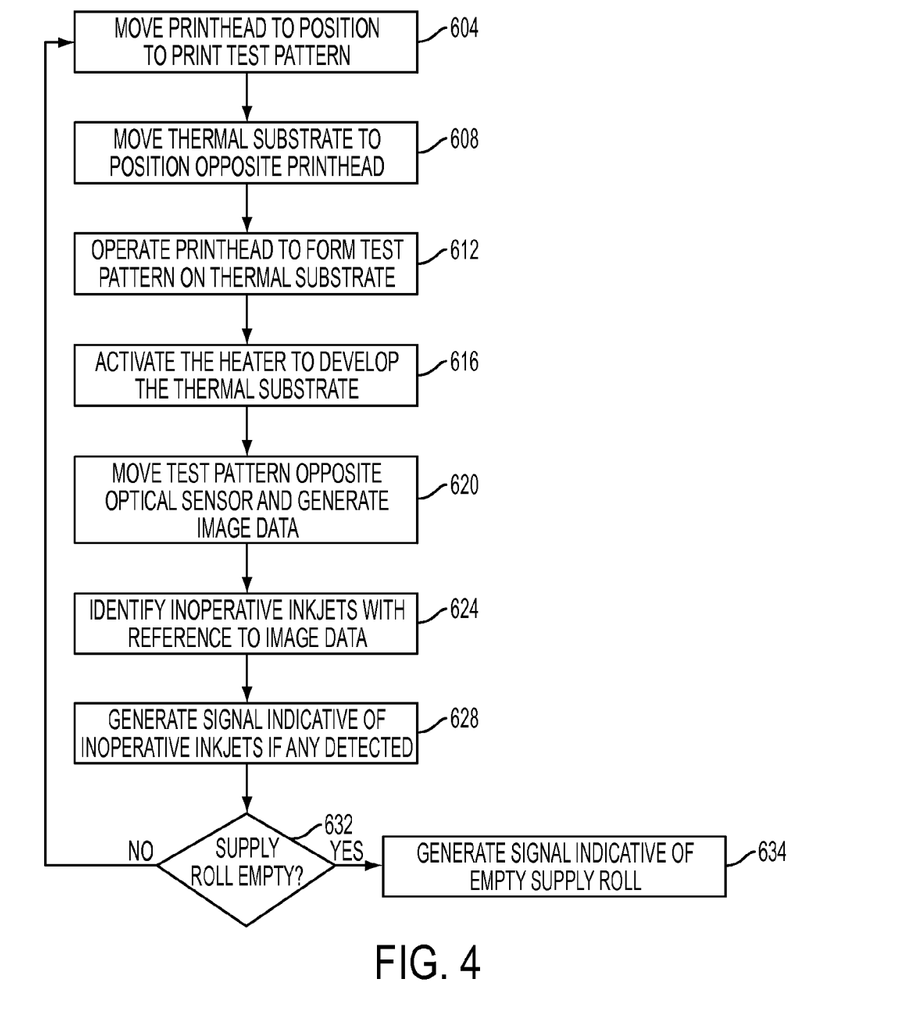
FIG. 4 is a flow diagram of a method for operating the module of FIG. 3.

A method of operating a printer that produces three-dimensional objects is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

Figure 5:
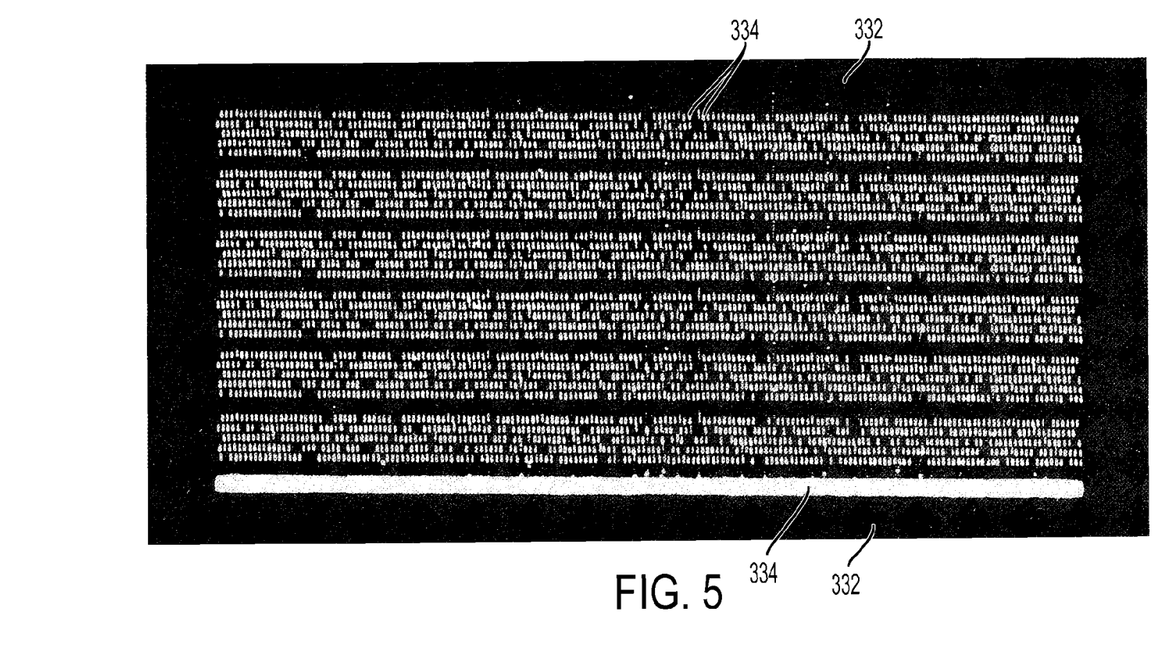
FIG. 5 is an example of the contrast between a developed thermal substrate and clear material ejected from a printhead onto the substrate.

At predetermined times in the printing operation, the controller 108 (FIG. 2) operates an actuator 104 to move the printhead 86 into the module 300 located in the area 112 (block 604). In response to the controller 324 detecting the printhead in the module 300, the controller 324 operates an actuator 316 to rotate take-up roller 314 and pull a clean portion of the thermal substrate from the supply on the roll 310 to a position beneath the printhead 86 (block 608). Once the substrate is in the printing position, controller 324 generates a signal to the controller 108 to operate the inkjets in the printhead to print a test pattern on the substrate (block 612). Controller 324 also activates the heater 320 to develop the thermal substrate as the substrate passes the heater (block 616). In one embodiment, each inkjet in the printhead is repetitively operated to form a pile of material, also called a test dot, on a portion of the substrate roll 310 opposite the inkjet. After the test pattern is printed, controller 108 moves the printhead 86 out of the module 300 and generates a signal for controller 324. In response to the signal from controller 108, controller 324 operates the actuator 316 to move the printed portion of the thermal substrate to a position opposite the optical sensor 304 (block 620). Because the heater was activated, the thermal substrate was exposed to heat, and therefore darkened, regardless of whether the exposure occurred prior to printing the test pattern, during the printing of the test pattern, or after the printing of the test pattern, but before reaching the optical sensor 304. Thus, a contrast is produced between the developed darkened thermal substrate and the materials ejected from the printhead 86. An example of this contrast between a developed thermal substrate 332 and material 334 ejected from a printhead is shown in FIG. 5. In printers using UV inks, this contrast occurs because UV curable inks have an alkaline component that neutralizes the active acid layer in the substrate, which prevents the substrate from darkening at that position.

The process of FIG. 4 continues with the optical sensor 304 being operated to generate electrical signals corresponding to the optical densities of the test pattern on the thermal substrate (block 620). The electrical signals are generated by operating the optical sensor to emit a light towards the test pattern on the portion of the printed thermal substrate and receive the reflections from the test pattern and thermal substrate with photodetectors that generate the electrical signals. These electrical signals are image data that are analyzed with reference to the function relating an optical density of each drop ejected onto the substrate to identify inoperative inkjets (block 624) and, if inoperative inkjets are identified, a signal indicative of the defective printhead is generated for the operator of the printer (block 628). The operator can then take appropriate action. The controller 324 determines if the supply roll 310 is empty (block 632), and if it is, generates a signal that indicates another supply roll is needed (block 634). An operator can then remove the take-up roll and provide another supply roll 310 of thermal substrate. If an adequate supply of thermal substrate remains, the controller 324 waits for the printhead to return to the position for printing another test pattern (block 604).

While the embodiments discussed above are within a printer that forms three-dimensional objects, a source of thermal substrate and the system that detects inoperative inkjets from the changes in optical density on such a substrate can be used in two dimensional document printing systems, particularly those that use clear inks. In such systems, a supply roll of thermal substrate is positioned within the printer, and, from time to time, a portion of the substrate is pulled from the supply roll, printed, exposed to heat, and analyzed to identify inoperative inkjets. Likewise, printheads ejecting clear ink onto a moving web or an imaging member, such as a drum, can be moved opposite a thermal substrate, either in sheet form or from a roll supply, printed, heated, imaged, and analyzed to identify inoperative inkjets.

While the embodiments discussed above are within a printer that forms three-dimensional objects, thermal substrates and the system that detects inoperative inkjets from the changes in optical density on such substrates can be used in two dimensional document printing systems, particularly those that use clear inks. Thus, as used in this document, the word "material" refers to substances that can be used to form three dimensional objects as well as inks used in document printing. In systems having printheads that eject these materials, a second supply of thermal substrate can be maintained and, from time to time, a portion of the substrate pulled from that supply, exposed to heat, printed, and analyzed to identify inoperative inkjets. Likewise, printheads ejecting clear ink onto a moving web or an imaging member, such as a drum, can be moved opposite a thermal substrate, either in sheet form or from a roll supply, for heating, printing and detection of inoperative inkjets. In embodiments of the apparatus described above that are used in two dimensional and three-dimensional printers, the order of the printing of the substrate and the heating of the substrate can be reversed. That is, the substrate is exposed to heat from the heater to turn the substrate dark and then the test pattern is printed on the darkened substrate. In these embodiments, the darkened substrate lightens where the material or ink contacts the substrate because the material or ink interferes with, or in some cases reverses, the chemistry between the dye layers of the substrate.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
   a printhead configured with a plurality of inkjets to eject material;
   a supply of thermal substrate configured to move thermal substrate to a position opposite the printhead to receive material ejected from the printhead;
   an optical sensor configured to generate electrical signals corresponding to an optical density of a location on the thermal substrate;
   an actuator operatively connected to the optical sensor to move the optical sensor to a position opposite the thermal substrate onto which material has been ejected;
   a heater configured to expose a length of thermal substrate to heat; and
   a controller operatively connected to both actuators, the optical sensor, the heater, and the printhead, the controller being configured to operate the printhead to eject a predetermined number of material drops from each inkjet onto the thermal substrate to enable the predetermined number of material drops to form a test dot for each inkjet on the thermal substrate, to operate the heater to darken the length of thermal substrate exposed to heat, to operate the actuator to move the optical sensor to a position opposite the thermal substrate to generate image data of the substrate and the test dots on the substrate, and to identify inoperative inkjets in the printhead with reference to the data received from the optical sensor that corresponds to optical densities of the thermal substrate at a plurality of locations on the thermal substrate.

2. The printer of claim 1, the supply of thermal substrate further comprising:
   a first roller, the supply of thermal substrate being wound in a roll mounted about the first roller;
   a second roller to which a loose end of the supply of thermal substrate is attached to enable thermal substrate to be transferred from the first roller by rotation of the second roller;
   an actuator operatively connected to the second roller and the controller, the actuator being configured to rotate the second roller; and
   the controller being further configured to operate the actuator operatively connected to the second roller to rotate the second roller to pull thermal substrate from the supply of thermal substrate mounted about the first roller.

3. The printer of claim 2, the controller being further configured to detect the supply of thermal substrate mounted about the first roller being exhausted and to generate a signal indicative of the supply of thermal substrate being exhausted to enable the thermal substrate wound on the second roller to be removed and another supply of thermal substrate to be mounted about the first roller.

4. The printer of claim 1, the controller being further configured to identify inkjets that do not eject drops of material of a predetermined size with reference to the data corresponding to the optical densities of the thermal substrate.

5. The printer of claim 1 wherein the printhead is configured to drop build material to form three-dimensional objects.

6. The printer of claim 1, the heater being positioned to expose the thermal substrate to heat energy sufficient to darken the thermal substrate while the printhead is ejecting material onto the thermal substrate.

7. The printer of claim 1, the heater being positioned to expose the thermal substrate to heat energy sufficient to darken the thermal substrate after the printhead has ejected material onto the thermal substrate.

8. The printer of claim 1, the heater being positioned to expose the thermal substrate to heat energy sufficient to darken the thermal substrate before the printhead is operated to eject material onto the thermal substrate.

9. An apparatus comprising:
   a supply of thermal substrate;
   an optical sensor configured to generate electrical signals data corresponding to an area of material drops on the substrate;
   an actuator operatively connected to the optical sensor to move the optical sensor to a position opposite the thermal substrate onto which material has been ejected;
   a heater configured to expose a length of thermal substrate to heat; and
   a controller operatively connected to the actuator, the optical sensor, and the heater, the controller being configured to operate the heater to darken the length of thermal substrate exposed to heat after inkjets in a printhead have been operated to eject a predetermined number of material drops from each inkjet onto the thermal substrate to enable the predetermined number of material drops to form a test dot for each inkjet on the thermal substrate, to operate the actuator to the optical sensor to a position opposite the thermal substrate, and to identify inoperative inkjets in the printhead with reference to the data received from the optical sensor that corresponds to optical densities of the thermal substrate at a plurality of locations on the thermal substrate.

10. The apparatus of claim 9, the supply of thermal substrate further comprising:
    a first roller, the supply of thermal substrate being wound in a roll mounted about the first roller;
    a second roller to which a loose end of the supply of thermal substrate is attached to enable thermal substrate to be transferred from the first roller by rotation of the second roller;
    an actuator operatively connected to the second roller and the controller, the actuator being configured to rotate the second roller; and
    the controller being further configured to operate the actuator operatively connected to the second roller to rotate the second roller to pull thermal substrate from the supply of thermal substrate mounted about the first roller.

11. The apparatus of claim 10, the controller being further configured to detect the supply of thermal substrate mounted about the first roller being exhausted and to generate a signal indicative of the supply of thermal substrate being exhausted to enable the thermal substrate wound on the second roller to be removed and another supply of thermal substrate to be mounted about the first roller.

12. The apparatus of claim 9, the controller being further configured to identify inkjets that do not eject material drops of a predetermined size with reference to the data corresponding to the optical densities of the thermal substrate.

13. The apparatus of claim 9 wherein the printhead is configured to drop build material to form three-dimensional objects.

14. The apparatus of claim 9, the heater being positioned to expose the thermal substrate to heat energy sufficient to darken the thermal substrate before the printhead is operated to eject material onto the thermal substrate.

15. The apparatus of claim 9, the heater being positioned to expose the thermal substrate to heat energy sufficient to darken the thermal substrate while the printhead is ejecting material onto the thermal substrate.

16. The apparatus of claim 9, the heater being positioned to expose the thermal substrate to heat energy sufficient to darken the thermal substrate after the printhead has ejected material onto the thermal substrate.

* * * * *